No. 849,849. PATENTED APR. 9, 1907.
C. S. MORSE.
VEHICLE WHEEL.
APPLICATION FILED DEC. 17, 1906.

2 SHEETS—SHEET 1.

Witnesses:

Inventor
Clyde S. Morse.
By Chas. C. Tillman atty.

No. 849,849. PATENTED APR. 9, 1907.
C. S. MORSE.
VEHICLE WHEEL.
APPLICATION FILED DEC. 17, 1906.
2 SHEETS—SHEET 2.
Fig. 3.
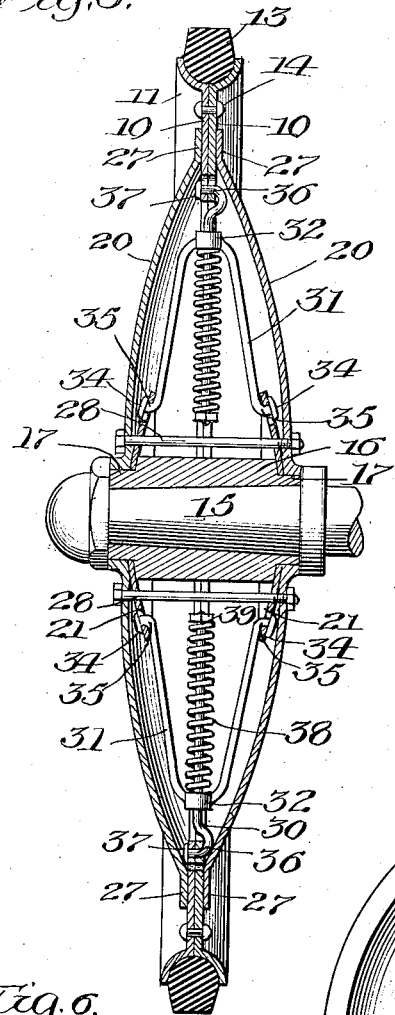
Fig. 4.
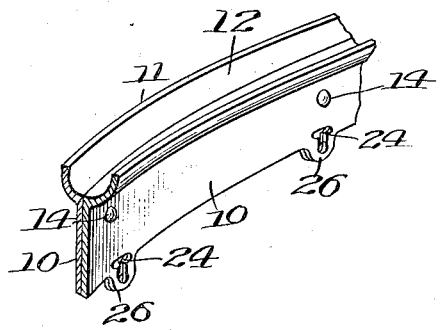
Fig. 5.
Fig. 6.
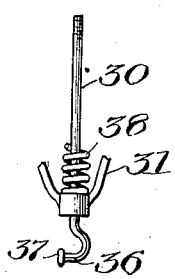
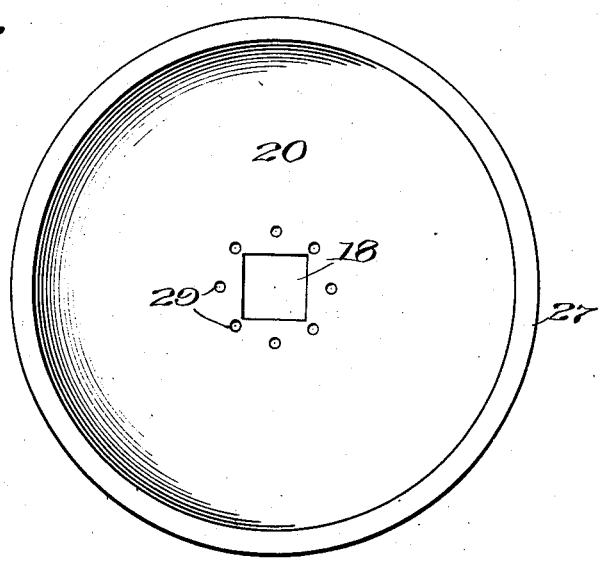
Witnesses:
O. M. Vennick
M. A. Nyman
Inventor:
Clyde S. Morse.
By Chas. C. Tillman Atty.

UNITED STATES PATENT OFFICE.

CLYDE S. MORSE, OF SHABBONA, ILLINOIS.

VEHICLE-WHEEL.

No. 849,849.      Specification of Letters Patent.      Patented April 9, 1907.

Application filed December 17, 1906. Serial No. 348,101.

*To all whom it may concern:*

Be it known that I, CLYDE S. MORSE, a citizen of the United States, residing at Shabbona, in the county of Dekalb and State of Illinois, have invented certain new and useful Improvements in Vehicle-Wheels, of which the following is a specification.

My present invention has relation to certain improvements in wheels, such as are adapted for use on automobiles, wagons, carriages, buggies, cars, and other vehicles; and it consists in certain novel features and principles of the construction, combination, and arrangement of the several parts thereof, whereby certain important advantages are attained and the same is rendered simpler, cheaper, and otherwise better adapted and more convenient for use, all as will be hereinafter fully set forth.

One of the important objects of the invention, which is similar to that set forth in an application, Serial No. 337,190, filed by me on October 3, 1906, for improvements in vehicle-wheels, namely, is to provide a wheel which shall be of such construction as to afford resiliency or a yielding or springy effect to the axle and through it to the body of the vehicle, thereby enabling the use of expensive pneumatic tires to be dispensed with; but I accomplish said object by means of the present invention in a different manner and by simple and efficient means.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1:
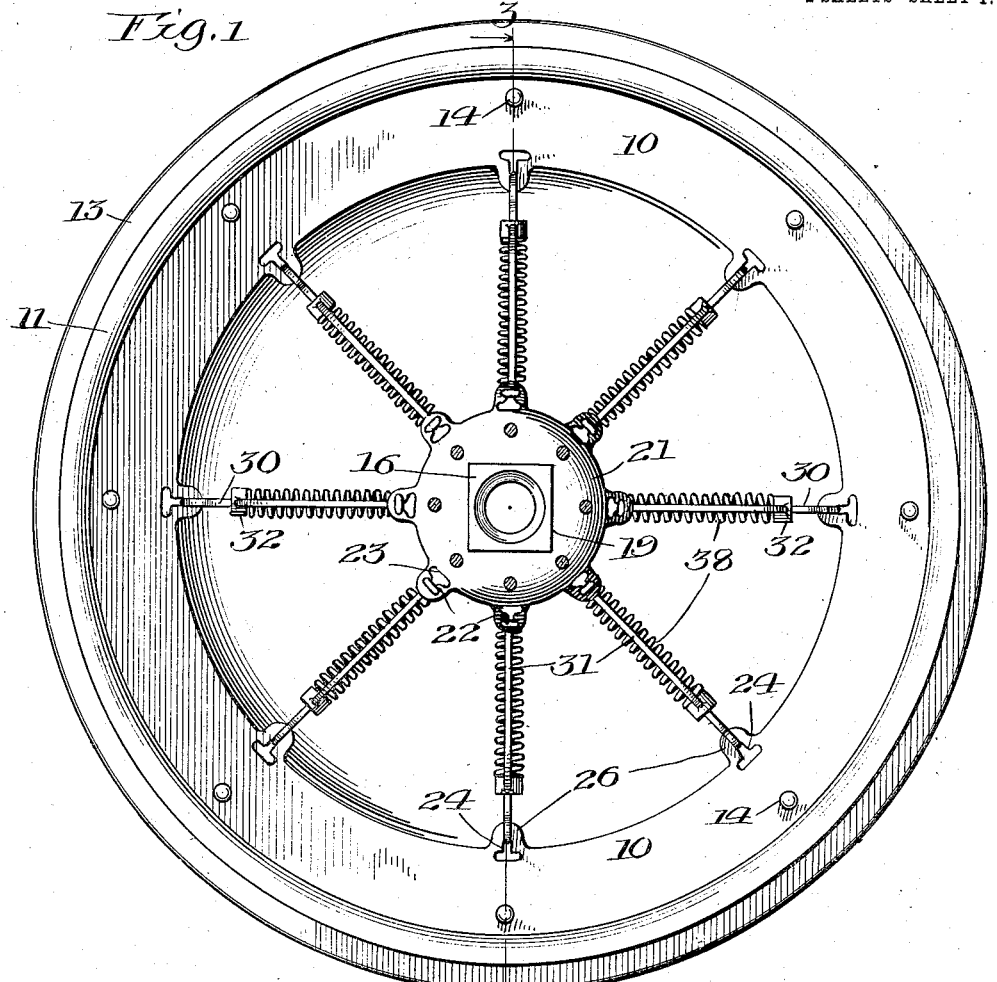
Figure 2:
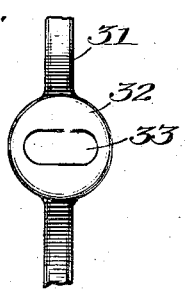

Figure 1 is a view in side elevation of a wheel embodying my invention, showing one of the protecting and strengthening plates removed in order to disclose the interior mechanism. Fig. 2 is a plan view of a portion of one of the holders for the spring-actuated spokes or radial rods. Fig. 3 is a vertical central sectional view taken on line 3 3 of Fig. 1, showing the manner of connecting the different parts of the wheel together and the means for regulating the tension of the springs surrounding the spokes or radial rods. Fig. 4 is a fragmental perspective view of a portion of the felly of the wheel. Fig. 5 is an inner face view of one of the protecting or strengthening plates, and Fig. 6 is a fragmental view of one of the holders for the spring-actuated spokes or radial rods.

Like numerals of reference refer to corresponding parts throughout the different views of the drawings.

The felly or outer rim of the wheel consists of two circular or ring-like members 10, which are preferably flat surfaced, as shown, and each has at its outer periphery an outwardly-bent portion 11 to form a channel 12 for the reception of the tire 13, which may be of the ordinary or any preferred construction and secured in place within the channel 12 by any suitable means. The flat ring-like portions 10 comprising the felly or outer rim of the wheel are firmly secured together near their outer portions by means of rivets 14, which are located close to the inner portions of the bent parts 11 and at some distance from the inner peripheries of the members 10, so as not to interfere with the movement of the protecting or strengthening plates, as will be hereinafter explained. Mounted so as to turn on the axle 15, which may be of the ordinary or any preferred construction, is a hub 16, which preferably has each of its ends reduced and formed rectangular, as at 17, to fit in rectangular openings 18 and 19, formed in the protecting-plates 20 and holder-supporting plates 21, respectively.

As is clearly shown in Figs. 1 and 3 of the drawings, the hub 16 has mounted so as to turn therewith on each of its ends a circular plate 21, which are for the purpose of connecting the holders for the spring-actuated rods or spokes with the hub and for carrying the same. Each of these plates is preferably formed concavo-convex, as shown, and has at its periphery a series of radially-disposed lugs 22, in each of which is formed a slot 23, which is enlarged at its inner portion and contracted outwardly, as is clearly shown in Fig. 1 of the drawings, in which view, as well as in Fig. 4, it will be seen that the members 10, comprising the felly, are provided on their inner portions with a series of openings 24, each of which is enlarged at its outer portion and contracted inwardly, and said openings are shown as being produced in lugs 26 on said members; but the formation of said lugs is not essential, and they may be dispensed with and the openings 24 formed near the inner peripheries of the members 10, as is obvious. By again referring to Fig. 3 of the drawings it will be seen that one of the plates 20, which are used for strengthening and protecting the interior mechanism of the wheel from mud, dust, and dirt, is mounted so as to turn therewith on each end of the hub and outwardly against each of the plates 21 and that the plates 20 are also concavo-convex in shape and have their outer portions formed parallel with one another, as at 27, so as to rest against the outer surfaces of the members 10, comprising the felly or outer rim of the wheel. The plates 20 are secured together by means of bolts 28, located in suitable openings 29 in said plates near the hub, which bolts also pass through suitable openings in the plates 21, which are thereby held securely in place. The holder-carrying plates 21 are connected to the felly by means of a series of spring-actuated spokes or radial rods 30 and a series of holders 31 therefor.

Each of the holders 31 is forked, as shown, and its prongs diverge toward their inner or free ends, while their other ends are united by means of an enlarged portion 32, which is provided with a slot or opening 33, which is elongated circumferentially with respect to the wheel when the holders are in place thereon. Each of the prongs of each of the holders 31 is bent outwardly and provided with a head 34, which are adapted to be passed through the enlarged portions of the openings 23 in the plates 21, when by drawing the holders outwardly from said plates it is apparent that the outturned portions 35 on said prongs will engage the contracted parts of the openings 23 in the holder-carrying plates. One of the spokes or radial rods 30 is movably located in each of the openings 33 of the holders therefor, and each of said rods has its inner end screw-threaded and its outer end bent laterally, as at 36, and formed with a head 37, which heads are adapted to be passed through the enlarged parts of the openings 24 in the felly, while the laterally-bent portions 36 will engage the contracted parts of said openings. Surrounding each of the rods 30 and resting at one of its ends on the inner surface of the enlargement 32 of each of the holders is a spring 38, against the other end of which rests a nut 39, which engages the screw-threaded or inner portion of the rod. By this arrangement it is apparent that by turning the nuts in the proper direction the tension of the springs 38 may be regulated to suit the requirements of the vehicle or load which it carries.

From the above description it will be evident that the improved vehicle-wheel constructed according to my invention is of a very inexpensive and simple construction and that its parts may be easily assembled, yet so constructed as to render easy access in case of repairs or otherwise to the interior mechanism by removing one of the strengthening or protecting plates. It will also be obvious from the above description that the device is susceptible to some modification without material departure from the principles and spirit of this invention, and for this reason I do not desire to be understood as limiting myself to the precise form and arrangement of the several parts herein set forth in carrying out my invention in practice.

In its operation, the axle 15 will be normally held in the center of the opening in the felly, for it will be understood that the springs 38 will be of sufficient strength to so maintain the parts until a load of considerable weight is placed in the vehicle, in which case the springs will yield slightly, so as to afford a resilient effect to the axle, and through it to the body of the vehicle, thus attaining the same effect as if expensive pneumatic tires were employed.

Having thus fully described my invention, what I claim as new, and desire to secure by Letters Patent, is—

1. In a vehicle-wheel, the combination with an axle, of a hub mounted thereon, a plate mounted at each end of said hub to turn therewith and having in its periphery a series of radially-disposed openings enlarged inwardly, a felly surrounding said plates at a distance therefrom, forked holders having the inner ends of their prongs engaged in the openings of said plates and their outer portions provided with an aperture, a spring-actuated rod located in the aperture of each of said holders and having its outer end connected to the felly.

2. In a vehicle-wheel, the combination with an axle, of a hub mounted thereon, a plate mounted at each end of said hub to turn therewith and having in its periphery a series of radially-disposed openings, a felly surrounding said plates at a distance therefrom, forked holders having the inner ends of their prongs engaged in the openings of said plates and their outer portions provided with an aperture, a spring-actuated rod located in the aperture of each of said holders and having its outer end connected to the felly, and a protecting-plate mounted on each end of the hub outwardly against the first-named plates and overlapping a portion of the felly.

3. In a vehicle-wheel, the combination with an axle, of a hub mounted thereon, a plate mounted at each end of said hub to turn therewith and having in its periphery a series of radially-disposed openings enlarged inwardly, a felly surrounding said plates at a distance therefrom and having near its inner periphery a series of radially-disposed openings enlarged outwardly, forked holders having on the inner ends of their prongs heads adapted to be passed through the enlarged portions of the openings in the first-named plates, each of said holders having in its outer end an aperture, a spring-actuated rod located in the aperture of each of said holders and having at its outer end a head adapted to be passed through the enlarged portions of the openings in the felly, and a protecting-plate mounted on each end of the hub outwardly from the first-named plates and overlapping at its periphery a portion of the felly.

CLYDE S. MORSE.

Witnesses:
CHAS. C. TILLMAN,
M. A. NYMAN.